(12) United States Patent
Nicolino (10) Patent No.: US 11,268,897 B2
(45) Date of Patent: Mar. 8, 2022

(54) CORROSION TESTING DEVICE

(71) Applicant: Tenaris Connections B.V., Amsterdam (NL)

(72) Inventor: Miguel Sandro Nicolino, Campana (AR)

(73) Assignee: Tenaris Connections B.V., Amsterdam (NL)

( * ) Notice: Subject to any disclaimer, the term of this patent is extended or adjusted under 35 U.S.C. 154(b) by 0 days.

(21) Appl. No.: 17/266,477

(22) PCT Filed: Aug. 7, 2019

(86) PCT No.: PCT/NL2019/050519
§ 371 (c)(1),
(2) Date: Feb. 5, 2021

(87) PCT Pub. No.: WO2020/032795
PCT Pub. Date: Feb. 13, 2020

(65) Prior Publication Data
US 2021/0262918 A1    Aug. 26, 2021

(30) Foreign Application Priority Data
Aug. 7, 2018   (NL) .................................... 2021434

(51) Int. Cl.
*G01N 17/04*   (2006.01)

(52) U.S. Cl.
CPC ................. *G01N 17/046* (2013.01)

(58) Field of Classification Search
CPC .... G01N 17/04; G01N 17/043; G01N 17/046; E21B 47/006
See application file for complete search history.

(56) References Cited

U.S. PATENT DOCUMENTS

| 2,664,744 | A |   | 1/1954 | Bilhartz et al. |
| 4,603,113 | A | * | 7/1986 | Bauer ..................... G01N 17/00 166/902 |
| 4,688,638 | A |   | 8/1987 | Williams et al. |
| 4,928,760 | A | * | 5/1990 | Freitas .................... E21B 47/00 166/113 |
| 5,095,977 | A |   | 3/1992 | Ford et al. |

(Continued)

OTHER PUBLICATIONS

PCT International Search Report and Written Opinion in International Appln. No. PT/NL2019/050519, dated Oct. 10, 2019, 9 pages.

*Primary Examiner* — Natalie Huls
(74) *Attorney, Agent, or Firm* — Fish & Richardson P.C.

(57) ABSTRACT

A corrosion testing device comprising a coupon holder for a sucker rod of a pump system and at least one coupon for corrosion testing, wherein the coupon holder comprises a holder body having an outer body surface and an inner contact surface, which inner contact surface is placeable on an outer rod surface of the sucker rod and defines a longitudinal body axis of the holder body, the at least one coupon is attached to the holder body and positioned at the outer body surface and at a radial coupon distance from the longitudinal body axis, the outer body surface comprises at least one guiding surface part located at a radial surface distance from the longitudinal body axis, and the radial surface distance is larger than the radial coupon distance.

28 Claims, 10 Drawing Sheets

(56) References Cited

U.S. PATENT DOCUMENTS

| | | | | |
|---|---|---|---|---|
| 6,131,659 | A * | 10/2000 | Johnson | E21B 47/00 166/250.05 |
| 7,185,531 | B2 * | 3/2007 | Souers | G01N 17/043 73/86 |
| 9,033,036 | B2 * | 5/2015 | Wilkinson | E21B 47/00 166/250.05 |
| 10,914,161 | B2 * | 2/2021 | Pietravalli | E21B 41/02 |
| 11,041,378 | B2 * | 6/2021 | Chen | E21B 47/006 |
| 2005/0267686 | A1 | 12/2005 | Ward et al. | |
| 2017/0226843 | A1 * | 8/2017 | Jovancicevic | G01N 17/046 |

* cited by examiner

CORROSION TESTING DEVICE

CROSS-REFERENCE TO RELATED APPLICATION(S)

This application is a U.S. National Phase Application under 35 U.S.C. § 371 and claims the benefit of priority to International Application Serial No. PCT/NL2019/050519, filed Aug. 7, 2019, which claims priority to The Netherlands Application Serial No. NL2021434, filed Aug. 7, 2018, the contents of which are hereby incorporated by reference.

FIELD OF THE INVENTION

A pump system is used to pump hydrocarbon fluids out of a hydrocarbon well via a wellbore located in the ground. In general, the wellbore comprises an outer well casing surrounding an inner well tubing. The pump system moves a sucker rod within the well tubing. Sucker rods are used in different types of pump systems, such as pump jack systems wherein the sucker rod is reciprocated and progressing cavity pump systems wherein the sucker rod is rotated.

The invention relates to a corrosion testing device comprising a coupon holder for a sucker rod of a pump system and at least one coupon for corrosion testing. In use, the coupon holder is attached to the sucker rod and located in the wellbore to move along with the sucker rod.

Such a corrosion testing device is known from U.S. Pat. No. 5,095,977. Said corrosion testing device has a coupon holder with an upper and lower threaded connection holding the coupon holder between two threaded pipe sections of the sucker rod. The coupon holder and the threaded pipe sections have the same diameter, due to which the aligned coupon holder is positioned flush with the threaded pipe sections. The coupon is located inside a chamber of the coupon holder. The fluids present in the wellbore can reach the coupon via fluid flow ports provided in the outer wall of the chamber.

BACKGROUND OF THE INVENTION

The invention is based on the insight that the corrosion tests of the coupon in the known corrosion testing device are negatively affected by the chamber in which the coupon is located. The fluid flow which is created by the fluid flow ports in the outer wall of the chamber does not accurately represent the general fluid flow in the wellbore. In particular, it does not accurately represent the fluid flow along pipe sections used in the wellbore, such as the sucker rod or the well tubing.

A further drawback of the known coupon holder is that it has a complex construction which is relatively difficult and expensive to produce.

Furthermore, the known coupon holder with its chamber and fluid flow ports in the outer wall forms a local disruption in the strength of the sucker rod. The strength of the sucker rod will in general be reduced. This creates a higher risk of failure.

In addition to this, it requires a relatively labour intensive operation to assemble the known coupon holder in the sucker rod. Removing the known coupon holder from the sucker rod is also relatively labour intensive.

Moreover, the known coupon holder can only be used with one coupon at the time.

SUMMARY OF THE INVENTION

The invention has the objective to provide an improved—or at least alternative—corrosion testing device. This objective is achieved by a corrosion testing device comprising a coupon holder for a sucker rod of a pump system and at least one coupon for corrosion testing, wherein the coupon holder comprises a holder body having an outer body surface and an inner contact surface, which inner contact surface is placeable on an outer rod surface of the sucker rod and defines a longitudinal body axis of the holder body, the at least one coupon is attached to the holder body and positioned at the outer body surface and at a radial coupon distance from the longitudinal body axis, the outer body surface comprises at least one guiding surface part located at a radial surface distance from the longitudinal body axis, and the radial surface distance is larger than the radial coupon distance.

Since the at least one coupon is positioned at the outer body surface of the holder body of the coupon holder, the fluid flow along the at least one coupon is similar to the general fluid flow in the wellbore. Due to this, the corrosion tests of the at least one coupon provides a more accurate prediction of how the material of the coupon would behave when used in the wellbore, in particular when used as pipe sections in for example the sucker rod or the well tubing.

The radial surface distance of the at least one guiding surface part is larger than the radial coupon distance of the at least one coupon. This prevents that the coupon will come in contact and damage the wellbore, more specifically the well tubing, when the sucker rod is moved within the wellbore.

The corrosion testing device having a coupon holder with its holder body placed on the outer rod surface of the sucker rod has a simple construction which is relatively easy and cheap to produce.

In U.S. Pat. No. 5,095,977, the coupon is located in a chamber positioned in line with the sucker rod. As a result of this it is not possible to construct the sucker rod completely with pipe sections. In the corrosion testing device according to the invention, the inner contact surface of the holder body of the coupon holder is placed on the outer rod surface of the sucker rod. This allows that the complete sucker rod can be constructed with pipe sections. The corrosion testing device will therefore not negatively affect the strength and stiffness of the sucker rod. This will reduce the risks of failure.

The space inside a well bore is very limited. The coupon of U.S. Pat. No. 5,095,977 is located in a chamber. The housing which forms said chamber takes up a relatively large part of the space available within the well bore. There is not much space left for the chamber. As a result of this, only one coupon is placed inside the chamber. In the corrosion testing device according to the invention, the at least one coupon is positioned at the outer body surface. Due to the fact that there is no housing surrounding a chamber, there is more space available within the well bore. This allows that multiple coupons can be attached to the holder body, which makes it possible to perform multiple corrosion tests at the same time.

In an embodiment of the corrosion testing device, the radial surface distance at which the at least one guiding part is positioned from the longitudinal axis is larger than a radial distance relative to the longitudinal body axis at which any other part of the coupon holder than the at least one guiding surface part is located.

In an embodiment of the corrosion testing device, the at least one guiding surface part extends along at least part of an outer cylinder surface of a virtual cylinder having a longitudinal cylinder axis coinciding with the longitudinal body axis, which outer cylinder surface is located at the radial surface distance from the longitudinal body axis, and the at least one coupon is located inside the cylinder at a distance from the outer cylinder surface.

In an embodiment of the corrosion testing device, the at least one guiding surface part is formed by at least one most distant surface part of the outer body surface when seen in a radial direction from the longitudinal body axis and the most distant coupon part of the at least one coupon extends until the radial coupon distance when seen in the radial direction from the longitudinal body axis.

In an embodiment of the corrosion testing device, the holder body is a rod guide and the at least one guiding surface part forms at least one guiding surface to in use guide the sucker rod through a wellbore.

In an embodiment of the corrosion testing device, the holder body comprises multiple guiding surface parts, a base body part to in use at least partly surround the sucker rod, and blades having a blade length measured along the longitudinal body axis, and each blade extends radially away from the base body part and ends at one of the guiding surface parts.

In an embodiment of the corrosion testing device, the blades extend parallel to the longitudinal body axis.

In an embodiment of the corrosion testing device, the coupons are attached to the blades.

In an embodiment of the corrosion testing device, each blade comprises a radially extending first side surface and an radially extending second side surface, which first and second side surfaces end at one of the guiding surface parts, and each coupon is located at one of the first and second side surfaces of the blades.

In an embodiment of the corrosion testing device, the blades comprise recesses in which the coupons are located.

In an embodiment of the corrosion testing device, the recesses are located in the blades and configured to position the coupons lower than the respective first and second side surfaces of the blades.

In an embodiment of the corrosion testing device, the recesses comprise a guiding side opening extending through the guiding surfaces parts and exposing the coupons.

In an embodiment of the corrosion testing device, each coupon comprises a first coupon side facing the blade to which said coupon is attached and an opposite second coupon side, and the first coupon sides are located at a coupon side distance from the outer body surface to in use allow a flow of fluid between the first coupon sides and the outer body surface.

In an embodiment of the corrosion testing device, all coupon sides of the coupons are free from contact with the outer body surface of the holder body to allow a fluid flow along all the coupon sides.

In an embodiment of the corrosion testing device, the coupons have and elongated form and extend parallel to the longitudinal body axis.

In an embodiment of the corrosion testing device, the inner contact surface of the holder body is configured to in use at least party surround and engage the outer rod surface of the sucker rod to fixate the coupon holder on the outer rod surface of the sucker rod by applying a clamping force on the outer rod surface.

In an embodiment of the corrosion testing device, the inner contact surface completely surrounds the outer rod surface of the sucker rod.

In an embodiment of the corrosion testing device, the holder body of the at least one coupon holder is injection moulded on the outer rod surface of the sucker rod.

In an embodiment of the corrosion testing device, the inner contact surface partly surrounds the outer rod surface of the sucker rod and the holder body comprises an access opening extending from the contact surface until the outer body surface along a complete body length of the holder body to provide an access for the sucker rod.

In an embodiment of the corrosion testing device, the coupon holder comprises at least one fixating unit to fixate the coupon holder on the outer rod surface of the sucker rod.

In an embodiment of the corrosion testing device, holder body is fixated on the outer body surface of the sucker rod by the holder body engaging the outer body surface.

In an embodiment of the corrosion testing device, the coupon holder has multiple coupons and each coupon comprises a different type of material.

In an embodiment of the corrosion testing device, each of the at least one coupon comprises a metal material.

In an embodiment of the corrosion testing device, the coupon holder comprises at least one attachment unit to attach the at least one coupon to the holder body in a coupon position at the outer body surface wherein the at least one coupon is located at the radial coupon distance from the longitudinal body axis.

In an embodiment of the corrosion testing device, the at least one attachment unit is configured to releasably attach the at least one coupon to the holder body.

Any combination of any number of the above mentioned embodiments of the corrosion testing device can be made.

The invention further relates to a sucker rod for a pump system, wherein the sucker rod comprises an outer rod surface, and at least one corrosion testing device according to the invention is placed with its inner contact surface of the coupon holder on the outer rod surface.

In an embodiment of the sucker rod, the holder body of the at least one corrosion testing device is injection moulded on the outer rod surface of the sucker rod.

In an embodiment of the sucker rod, multiple corrosion testing devices are placed on the outer rod surface of the sucker rod at a holder distance from each other along the sucker rod.

Any combination of any number of the above mentioned embodiments of the sucker rod can be made.

The invention further relates to a pump system comprising a sucker rod and configured to move the sucker rod within a wellbore, wherein the sucker rod comprises an outer rod surface, and at least corrosion testing device according to the invention is placed with its inner contact surface of the coupon holder on the outer rod surface.

In an embodiment of the pump system, the holder body of the at least one coupon holder is injection moulded on the outer rod surface of the sucker rod.

In an embodiment of the pump system, multiple coupon holders are placed on the outer rod surface of the sucker rod at a holder distance from each other along the sucker rod.

Any combination of any number of the above mentioned embodiments of the pump system can be made.

The invention further relates to a method to test at least one material for use as a wellbore, in particular for use as a pipe section in the wellbore, wherein said method comprises fixating a coupon holder of a corrosion testing device according to the invention on an outer rod surface of a sucker rod of a pump system, wherein the at least one coupon comprises the at least one material, placing the sucker rod and the corrosion testing device in the wellbore and moving 30 the sucker rod and the corrosion testing device within the wellbore for a predetermined time period, and removing the sucker rod from the wellbore and analysing the at least one coupon of the corrosion testing device to determine a corrosion rate for each of the at least one coupon.

In an embodiment of the method, the method comprises removing the at least one coupon from the coupon holder to analyse the at least one coupon.

In an embodiment of the method, the method comprises determining a suitability indicator, such as a suitability value, to each material of the at least one coupon on basis of their corrosion rate.

In an embodiment of the method, the suitability indicator reflects the suitability of the material of the at least one coupon in said wellbore.

In an embodiment of the method, the suitability indicator is, besides the corrosion rate, determined on basis of weight loss and/or visual examination of localised corrosion.

In an embodiment of the method, the corrosion testing device comprises multiple coupons which are made from a different material and the method comprises analysing the coupons to determine a corrosion rate for each of the coupons.

In an embodiment of the method, the method comprises determining a suitability indicator, such as a suitability value, to each of the materials of the coupons on basis of their corrosion rates, and selecting one of the materials of the coupons to be used for maintenance operations on the wellbore and/or sucker rod on basis of the suitability indicator of said material.

In an embodiment of the method, the method comprises fixating multiple corrosion testing devices with their coupon holder on the outer rod surface of the sucker rod at a holder distance from each other along the sucker rod, moving the sucker rod and the corrosion testing device through the wellbore for a predetermined time period through a predetermined section of the wellbore, and analysing the coupons to determine a section corrosion rate for each of the coupons relating to the section of the wellbore in which the coupon has been moved.

In an embodiment of the method, the method comprises assigning a section suitability indicator, such as a section suitability value, to each material of the at least one coupon on basis of their section corrosion rate.

In an embodiment of the method, the section suitability indicator reflects the suitability of the material of the at least one coupon in said section of the wellbore.

In an embodiment of the method, method comprises selecting one of the materials of the coupons to be used for maintenance operations on the wellbore and/or sucker rod on basis of the section suitability indicators of said material.

Any combination of any number of the above mentioned embodiments of the method can be made.

The invention further relates to a kit of parts comprising a coupon holder having a holder body with an outer body surface and an inner contact surface, which inner contact surface is placeable on an outer rod surface of a sucker rod for a pump system and defines a longitudinal body axis of the holder body, wherein the outer body surface comprises at least one guiding surface part located at a radial surface distance from the longitudinal body axis, at least one coupon for corrosion testing, and at least one attachment unit to attach the at least one coupon to the holder body of the coupon holder in a coupon position at the outer body surface, wherein the at least one coupon in the coupon position is located at a radial coupon distance from the longitudinal body axis, which the radial coupon distance is smaller than the radial surface distance.

The kit of parts allows to build a corrosion testing device according to the invention.

The invention further relates to a coupon holder having holder body with an outer body surface and an inner contact surface, which inner contact surface is placeable on an outer rod surface of a sucker rod for a pump system and defines a longitudinal body axis of the holder body, wherein the outer body surface comprises at least one guiding surface part located at a radial surface distance from the longitudinal body axis, wherein at least one attachment unit is provided to attach at least one coupon for corrosion testing to the holder body of the coupon holder in a coupon position at the outer body surface, wherein in use the at least one coupon in the coupon position is located at a radial coupon distance from the longitudinal body axis, which the radial coupon distance is smaller than the radial surface distance.

The coupon holder is an essential element to build the corrosion testing device according to the invention.

BRIEF DESCRIPTION OF THE INVENTION

Embodiments of the corrosion testing device, sucker rod, pump system, method, kit of parts, and coupon holder will be described by way of example only, with reference to the accompanying schematic drawings in which corresponding reference symbols indicate corresponding parts, and in which:

the FIGS. 1A and B schematically show a side view of an embodiment of the pump system according to the invention, FIG. 2A schematically shows an enlarged side view of part II of FIG. 1A, FIG. 2B schematically shows a view in cross section along line II-II of FIG. 2A, FIG. 3 schematically shows a view in perspective the corrosion testing device of FIG. 1, FIG. 4 schematically shows a side view of the corrosion testing device of FIG. 3, the FIGS. 5A and B schematically show a view in cross section along line V-V of FIG. 4, FIG. 6 schematically shows a view in perspective of an alternative embodiment of the corrosion testing device according to the invention, and FIG. 7 schematically shows a view in perspective of another alternative embodiment of the corrosion testing device according to the invention.

DETAILED DESCRIPTION OF THE INVENTION

Figure 1A:
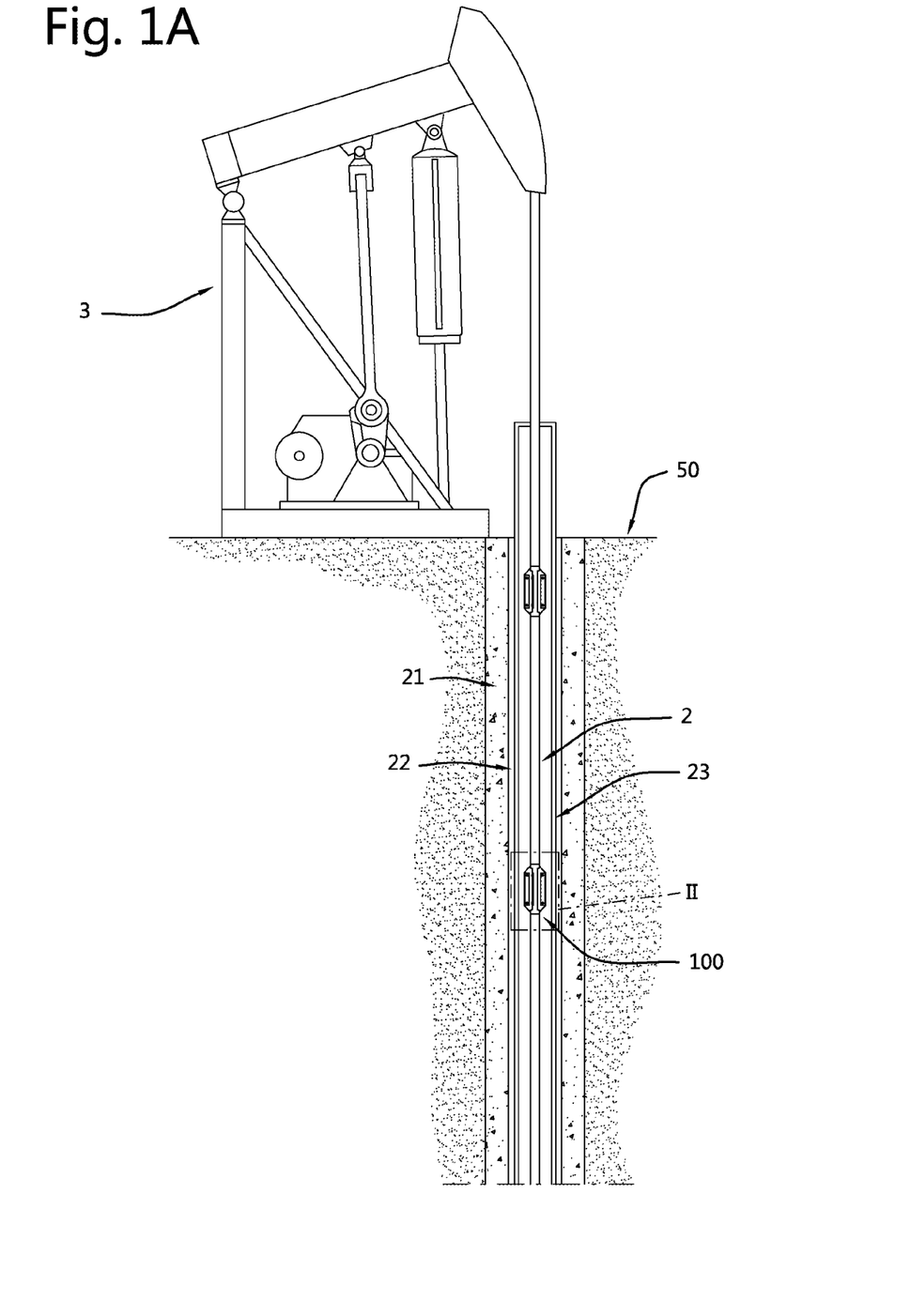
Figure 1B:
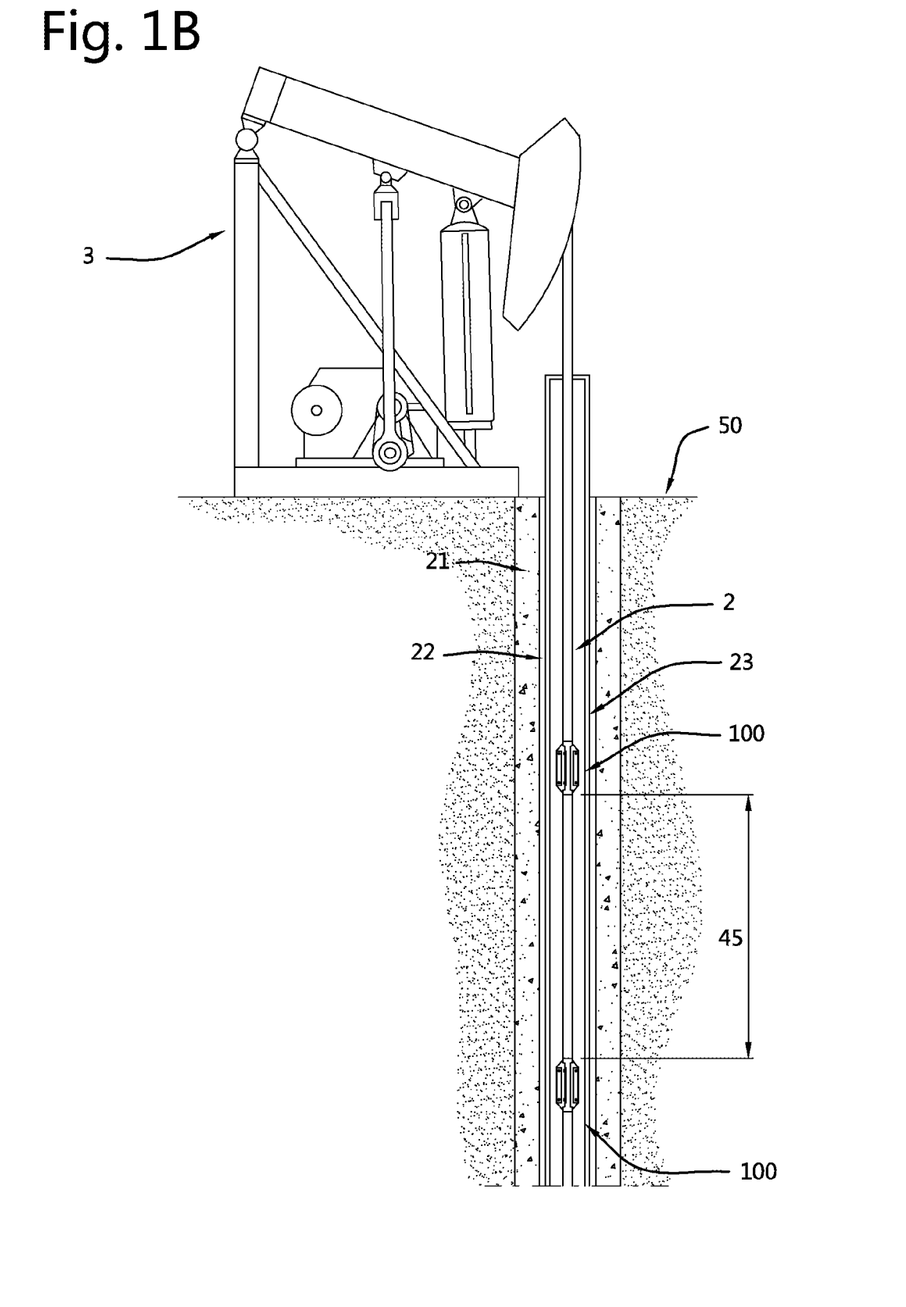

The FIGS. 1A and B show an embodiment of the pump system 3 according to the invention. The pump system 3 is used to pump hydrocarbon fluids out of a hydrocarbon well via a wellbore 21 located in the ground 50. The wellbore 21 comprises an outer well casing 22 surrounding an inner well tubing 23. A sucker rod 2 is located in the wellbore 21, more specifically in the well tubing 23. A piston (not shown) configured to pump the hydrocarbon fluid out of the well bore is attached to the lower end of the sucker rod 2. The pump system 3 is a pump jack system which moves up and down as shown in the FIGS. 1A and B. This way, the sucker rod 2 and piston are moved within the well tubing 23 in a reciprocal manner. In an alternative embodiment, the pump system 3 is a progressing cavity pump system configured to rotate the sucker rod 2 within the well bore, more specifically the well tubing 23.

Multiple corrosion testing devices 100 are attached to the sucker rod 2. The corrosion testing devices 100 are located at a holder distance 45 from each other along the sucker rod 2. Only two corrosion testing devices 100 are shown in the FIGS. 1A and B.

Figure 2A:
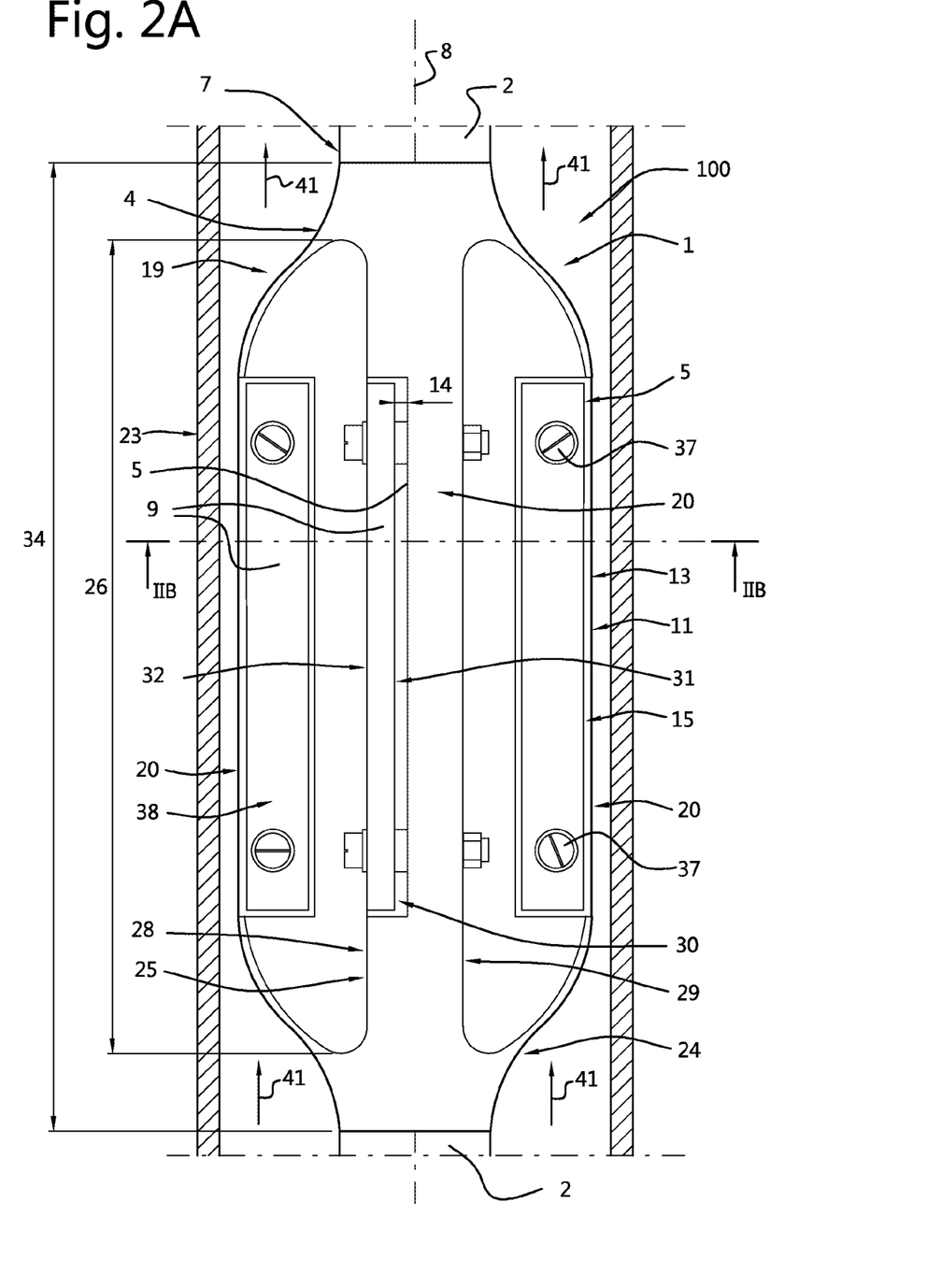
Figure 2B:
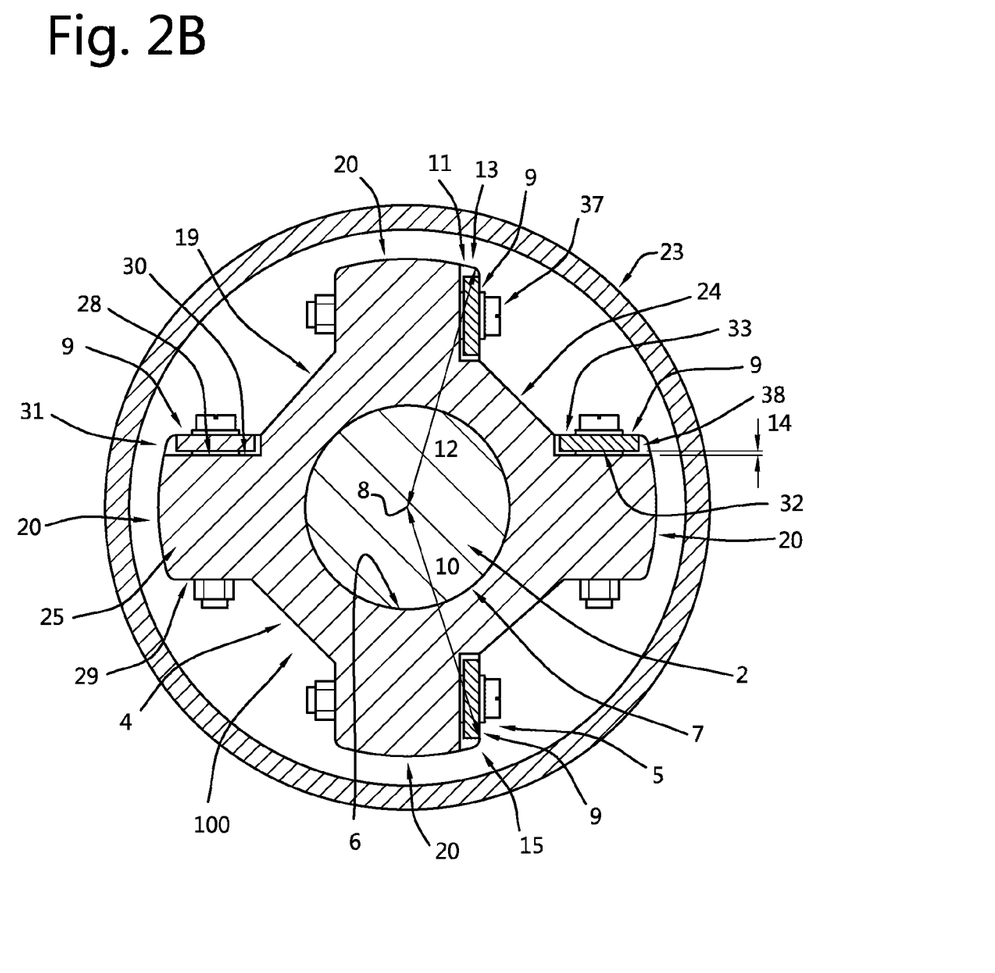

The corrosion testing devices 100 being positioned in the well tubing 23 of the wellbore 21 is shown more in detail in the FIGS. 2A and B. The corrosion testing device 100 comprises a coupon holder 1 having a holder body 4 with an outer body surface 5 and an inner contact surface 6. The inner contact surface 6 is placed on an outer rod surface 7 of the sucker rod 2 and defines a longitudinal body axis 8 of the holder body 4.

In the shown situation, the holder body 4 is placed on the outer rod surface 7 of the sucker rod 2 by injection moulding. The inner contact surface 6 of the holder body 4 is configured to completely surround and engage the outer rod surface 7 of the sucker rod 2 to fixate the coupon holder 1 on the outer rod surface 7 of the sucker rod 2.

Figure 6:
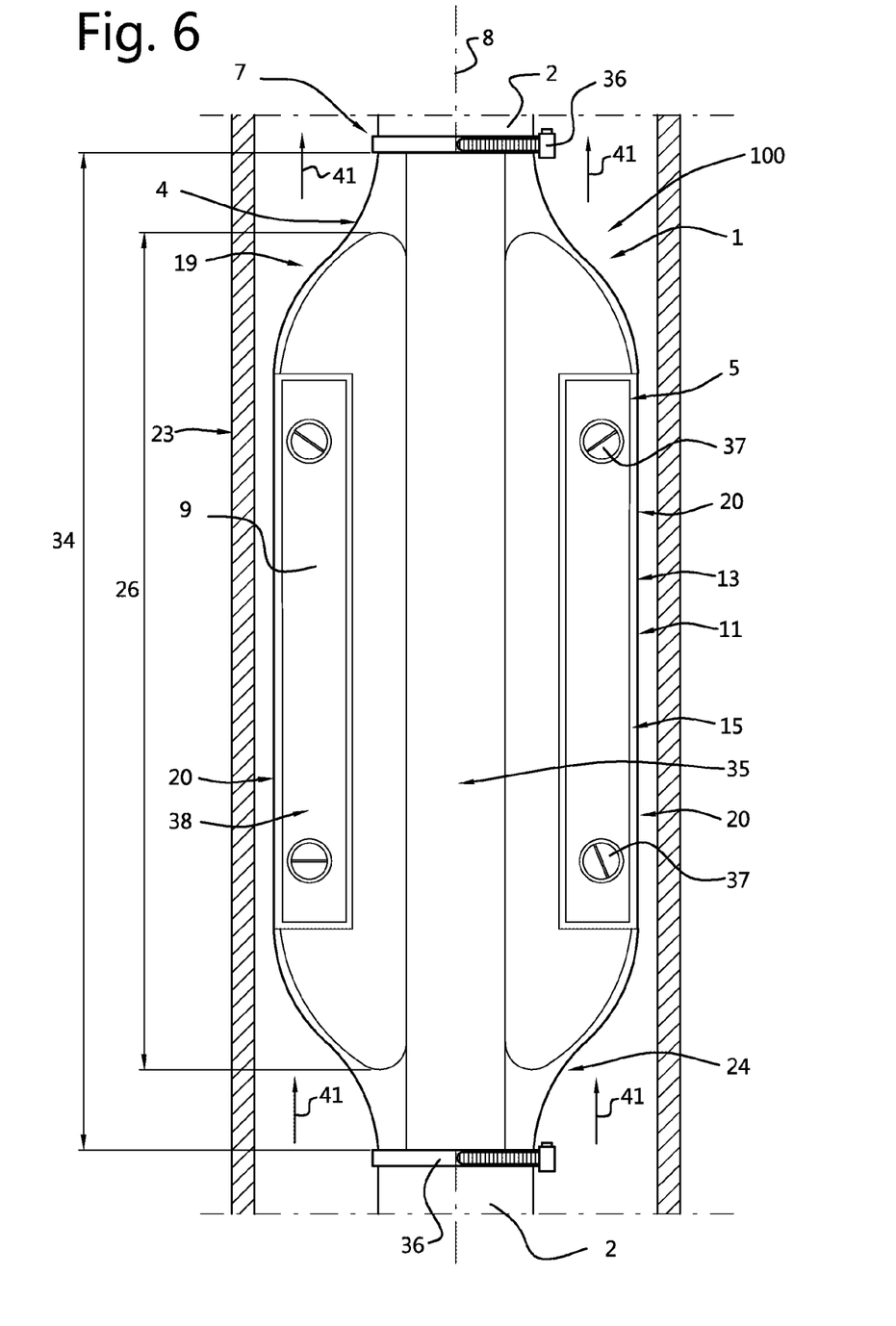

In an alternative embodiment of the corrosion testing device 100 shown in FIG. 6, the inner contact surface 6 partly surrounds the outer rod surface 7 of the sucker rod 2 and the holder body 4 comprises an access opening 35 extending from the contact surface until the outer body surface 5 along a complete body length 34 of the holder body 4 to provide an access for the sucker rod 2. The access opening 35 allows that the holder body 4 is placed around the sucker rod 2. The corrosion testing device 100 comprises two fixating units 36 to fixate the coupon holder 1 on the outer rod surface 7 of the sucker rod 2.

Figure 7:
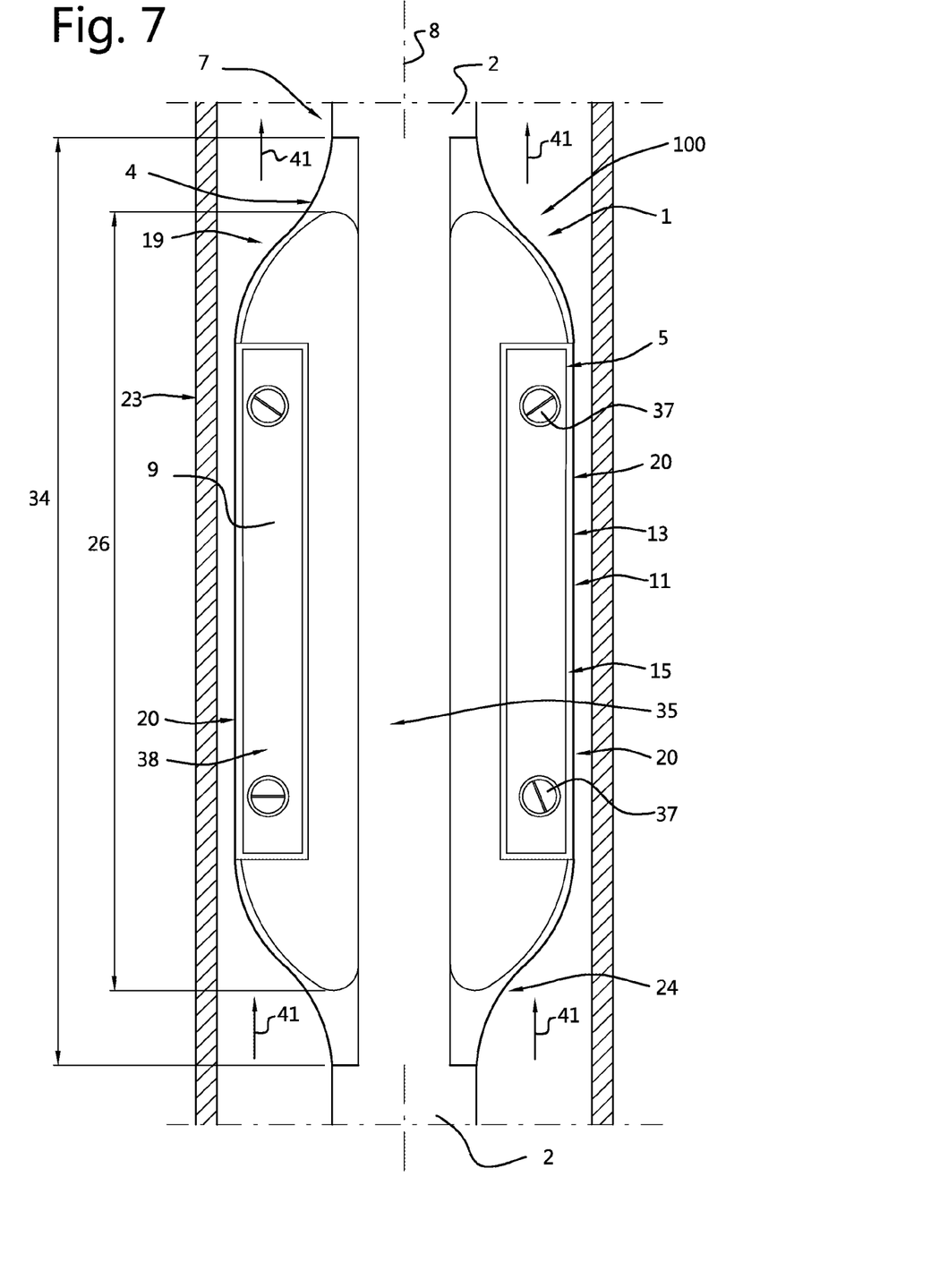

In the alternative embodiment of the corrosion testing device 100 shown in FIG. 7, the holder body 4 is fixated on the outer rod surface 7 of the sucker rod 2 by the holder body 4 engaging and applying a clamping force on the outer rod surface 7. In this situation, the holder body 4 is fixated to the sucker rod 2 by the stiffness of the holder body 4.

The corrosion testing device 100 comprises four coupons 9 for corrosion testing. The coupons 9 are attached to the holder body 4 and positioned at the outer body surface 5. The coupons 9 are located at a radial coupon distance 10 from the longitudinal body axis 8. The outer body surface 5 comprises four guiding surface parts 11 located at a radial surface distance 12 from the longitudinal body axis 8. The radial surface distance 12 is larger than the radial coupon distance 10.

Since the coupons 9 are positioned at the outer body surface 5 of the holder body 4, the fluid flow 41 along the at least one coupon is similar to the general fluid flow 41 in the wellbore 21. Due to this, the corrosion tests of the coupons 9 provide a more accurate prediction of how the material of the coupons 9 would behave when used in the wellbore 21, in particular when used as pipe sections in for example the sucker rod 2 or the well tubing 23.

The guiding surface parts 11 are formed by the most distant surface part 13 of the outer body surface 5 when seen in a radial direction from the longitudinal body axis 8. The most distant coupon part 15 of the coupons 9 extend until the radial coupon distance 10 when seen in the radial direction from the longitudinal body axis 8. The radial surface distance 12 is 5 mm larger than the radial coupon distance 10. The radial surface distance 12 of the guiding surface parts 11 is larger than a radial distance relative to the longitudinal body axis 8 at which any other part of the outer body surface 5 than the guiding surface 11 parts are located.

Due to the fact that the radial surface distance 12 of the guiding surface parts 11 is larger than the radial coupon distance 10 of the coupons 9, it is prevented that the coupons 9 will come in contact and damage the wellbore 21, more specifically the well tubing 23, when the sucker rod 2 is moved within the wellbore 21.

The corrosion testing device 100 with its holder body 4 of the coupon holder 1 placed on the outer rod surface 7 of the sucker rod 2 has a simple construction which is relatively easy and cheap to produce.

The fact that the inner contact surface 6 of the holder body 4 is placed on the outer rod surface 7 of the sucker rod 2 allows that the complete sucker rod 2 can be constructed with pipe sections. The corrosion testing device 100 will therefore not negatively affect the strength of the sucker rod 2. This will reduce the risks of failure.

The coupons 9 are positioned at the outer body surface 5, which allows that multiple coupons 9 can be attached to the holder body 4. This makes it possible to perform multiple corrosion tests at the same time.

The holder body 4 is a rod guide 19 and the guiding surface parts 11 forms guiding surfaces 20 to in use guide the sucker rod 2 through a wellbore 21. Rod guides 19 are used to guide the sucker rod 2 through the wellbore 21. The rod guides 19 ensure that the sucker rod 2 does not come in contact with the wellbore 21, more specifically the well tubing 23. By configuring the holder body 4 as a rod guide 19, the corrosion testing device 100 perform two functions at the same time in a very efficient manner.

The holder body 4 comprises a base body part 24 which surrounds the sucker rod 2, and blades 25 having a blade length 26 measured along the longitudinal body axis 8. Each blade 25 extends radially away from the base body part 24 and ends at one of the guiding surface parts 11. The blades 25 extend parallel to the longitudinal body axis 8. The blades 25 ensure that the corrosion testing device 100 can guide the sucker rod 2 through the wellbore 21 with a limited disturbance of the fluid flow 41 through the wellbore 21.

The coupons 9 are attached to the blades 25. Each blade 25 comprises a radially extending first side surface 28 and an radially extending second side surface 29, which first and second side surfaces 28 and 29 end at one of the guiding surface parts 11. Each coupon 9 is located at one of the first and second side surfaces 28 and 29 of the blades 25. By positioning the coupons 9 at the blades 25, the fluid flow 41 along the coupons 9 will be similar as the fluid flow 41 along pipe sections used in the wellbore 21, such as in the sucker rod 2 or the well tubing 23.

The blades 25 comprise recesses 30 in which the coupons 9 are located. The recesses 30 are located in the blades 25 and configured to position the coupons 9 lower than the respective first and second side surfaces 28 and 29 of the blades 25. The terms "lower than" can also be interpreted as "closer to the longitudinal body axis 8". By positioning the coupons 9 in the recesses 30, the disturbance of the fluid flow 41 through the wellbore 21 is further reduced.

The recesses 30 comprise a guiding side opening 31 extending through the guiding surface parts 11 and exposing the coupons 9. This way, a larger part of the coupons 9 is directly exposed to the fluid flow 41 in the wellbore 21.

Each coupon 9 comprises a first coupon side 32 facing the blade 25 to which the coupon 9 is attached and an opposite second coupon side 33. The first coupon sides 32 are located at a coupon side distance 14 from the outer body surface 5 to allow a flow of fluid between the first coupon sides 32 and the outer body surface 5. This way, a larger part of the coupons 9 is exposed to the fluid flowing through the wellbore 21.

To ensure that all coupon sides of the coupons 9 are exposed to the fluid flowing through the wellbore 21, all the coupon sides are free from contact with the outer body surface 5 of the holder body 4.

The coupons 9 have and elongated form and extend parallel to the longitudinal body axis 8. In other embodiments of the coupon holder 1 (not shown), the coupons 9 may have a different form.

Each of the four coupons 9 may comprise a different type of material. This way it is possible to test different materials at the same time. All the coupons 9 comprises a metal material.

The corrosion testing device 100 comprises attachment units 37 to attach the coupons 9 to the holder body 4 of the coupon holder 1 in a coupon position 38 at the outer body surface 5 wherein the coupons 9 are located at the radial coupon distance 10 from the longitudinal body axis 8. The attachment units 37 are configured to releasably attach the coupons 9 to the holder body 4.

Figure 3:
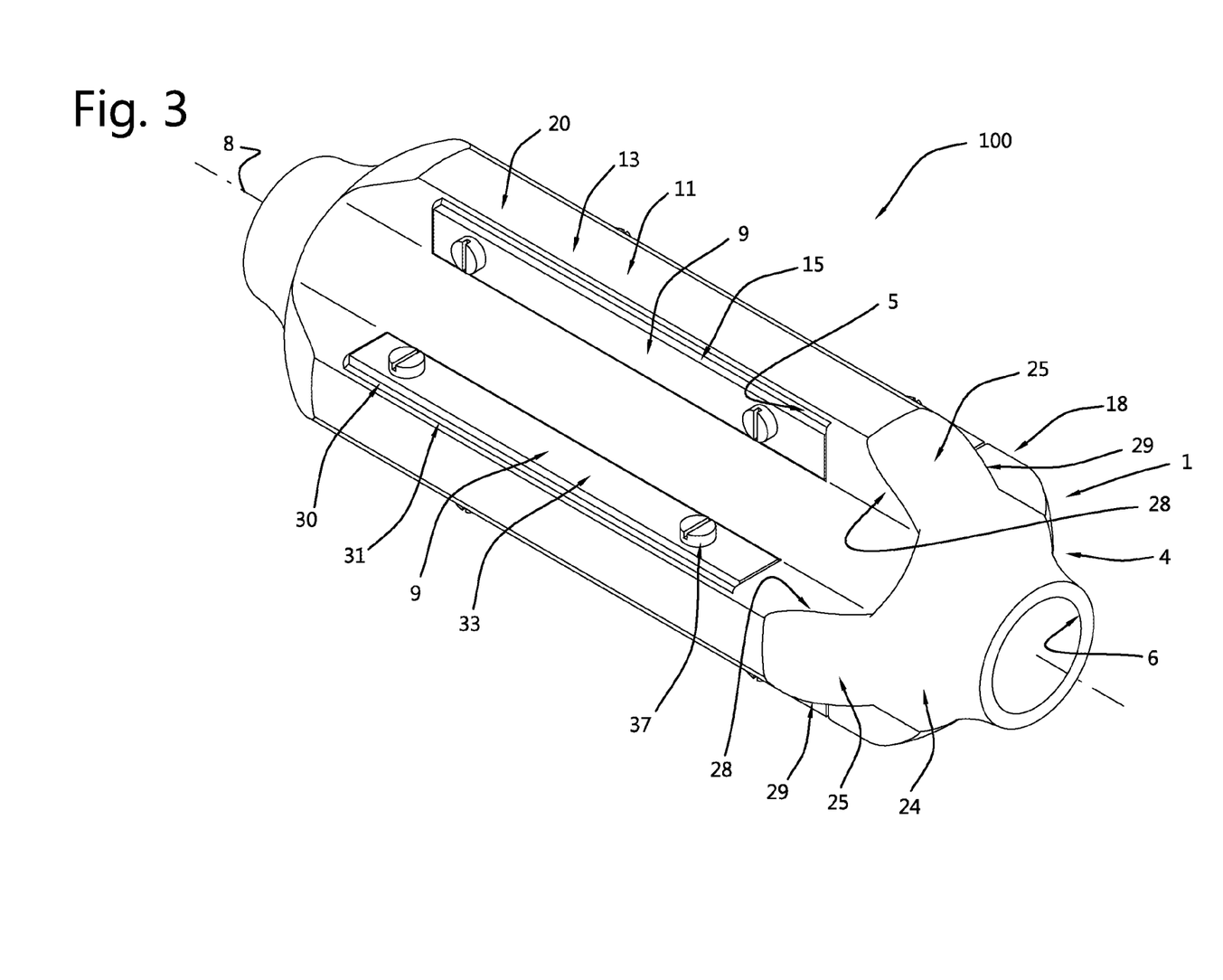
Figure 4:
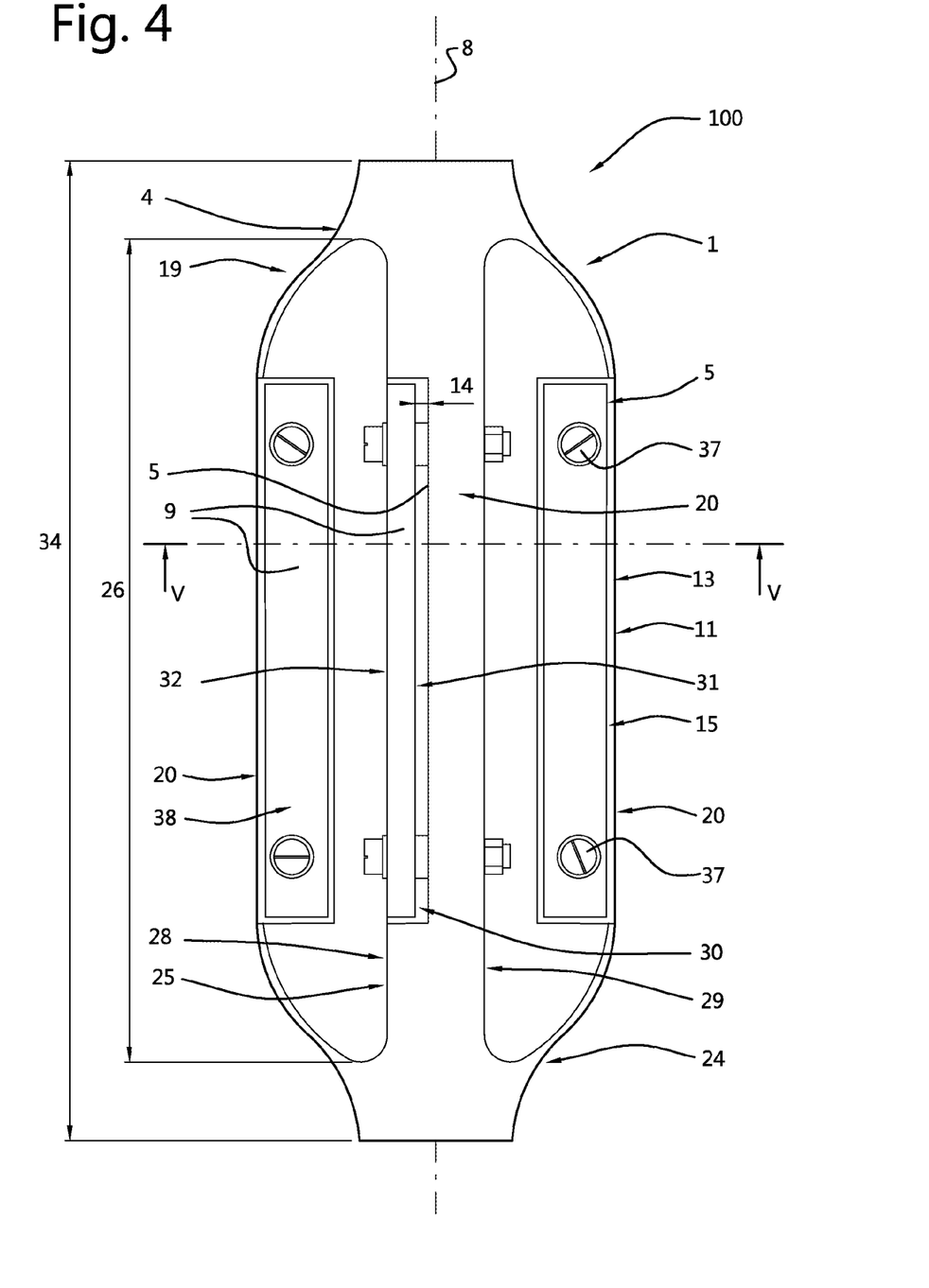
Figure 5A:
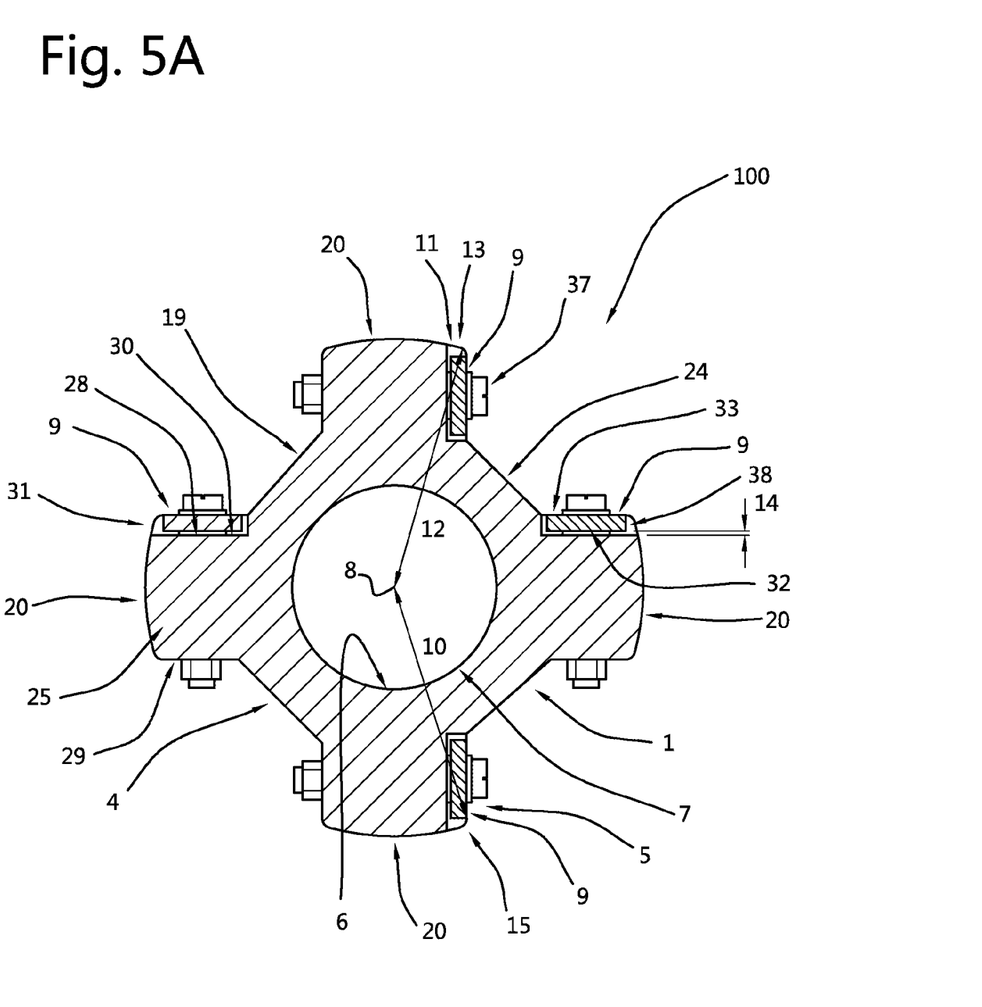
Figure 5B:
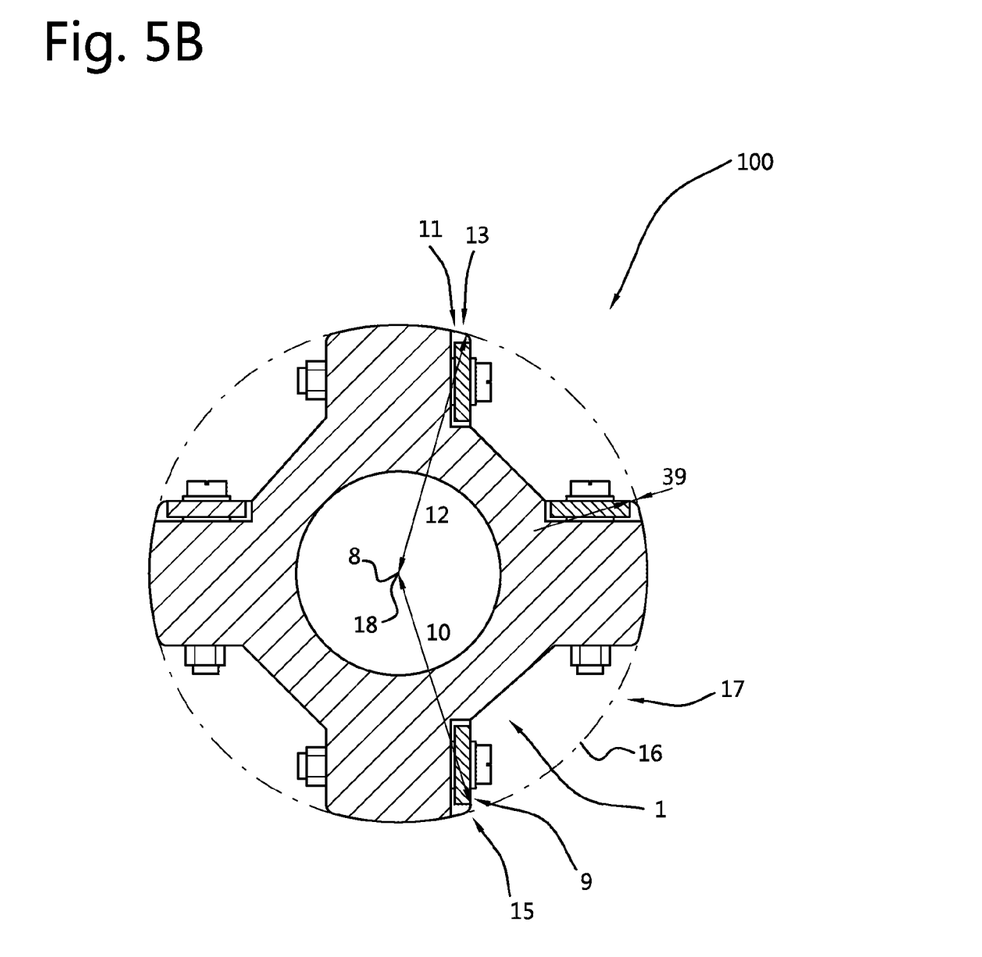

FIG. 3 shows a view in perspective the corrosion testing device 100 of FIG. 1 (without the well tubing 23 and sucker rod 2). A side view of the corrosion testing device 100 is shown in FIG. 4. FIG. 5A shows a view in cross section along line V-V of FIG. 4. In FIG. 5B, a virtual cylinder 17 is added to the view of FIG. 5A.

FIG. 5B shows that the guiding surface parts 11 extend along at least part of an outer cylinder surface 16 of the virtual cylinder 17 having a longitudinal cylinder axis 18 coinciding with the longitudinal body axis 8. The outer cylinder surface 16 is located at the radial surface distance 12 from the longitudinal body axis 8. The coupons 9 are located inside the virtual cylinder 17 at a distance from the outer cylinder surface 16.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

It will be apparent to those skilled in the art that various modifications can be made to the corrosion testing device, sucker rod, pump system, method, kit of parts, and coupon holder without departing from the scope as defined in the claims.

The invention claimed is:

1. A corrosion testing device comprising:
   a coupon holder for a sucker rod of a pump system, the coupon holder comprising a holder body having an outer body surface and an inner contact surface, which inner contact surface is placeable on an outer rod surface of the sucker rod and defines a longitudinal body axis of the holder body; and
   at least one coupon for corrosion testing, wherein,
   the at least one coupon is attached to the holder body and positioned at the outer body surface and at a radial coupon distance from the longitudinal body axis,
   the outer body surface comprises at least one guiding surface part located at a radial surface distance from the longitudinal body axis, and
   the radial surface distance is larger than the radial coupon distance.

2. The corrosion testing device according to claim 1, wherein the at least one guiding surface part is formed by at least one most distant surface part of the outer body surface when seen in a radial direction from the longitudinal body axis and the most distant coupon part of the at least one coupon extends until the radial coupon distance when seen in the radial direction from the longitudinal body axis.

3. The corrosion testing device according to claim 1, wherein the holder body is a rod guide and the at least one guiding surface part forms at least one guiding surface to in use guide the sucker rod through a wellbore.

4. The corrosion testing device according to claim 3, wherein;
   the holder body comprises multiple guiding surface parts,
      a base body part to in use at least partly surround the sucker rod, and blades having a blade length measured along the longitudinal body axis, and
   each blade extends radially away from the base body part and ends at one of the guiding surface parts.

5. The corrosion testing device according to claim 4, wherein the coupons are attached to the blades.

6. The corrosion testing device according to claim 4, wherein each blade comprises a radially extending first side surface and an radially extending second side surface, which first and second side surfaces end at one of the guiding surface parts, and each coupon is located at one of the first and second side surfaces of the blades.

7. The corrosion testing device according to claim 4, wherein the blades comprise recesses in which the coupons are located.

8. The corrosion testing device according to claim 7, wherein the recesses are located in the blades and configured to position the coupons lower than the respective first and second side surfaces of the blades.

9. The corrosion testing device according to claim 7, wherein the recesses comprise a guiding side opening extending through the guiding surfaces parts and exposing the coupons.

10. The corrosion testing device according to claim 4, wherein each coupon comprises a first coupon side facing the blade to which said coupon is attached and an opposite second coupon side, and the first coupon sides are located at a coupon side distance from the outer body surface to in use allow a flow of fluid between the first coupon sides and the outer body surface.

11. The corrosion testing device according to claim 4, wherein all coupon sides of the coupons are free from contact with the outer body surface of the holder body to allow a fluid flow along all the coupon sides.

12. The corrosion testing device according to claim 1, wherein the at least one coupon has an elongated form and extends parallel to the longitudinal body axis.

13. The corrosion testing device according to claim 1, wherein the inner contact surface of the holder body is configured to in use at least partly surround and engage the outer rod surface of the sucker rod to fixate the coupon holder on the outer rod surface of the sucker rod by applying a clamping force on the outer rod surface.

14. The corrosion testing device according to claim 1, wherein the coupon holder comprises at least one fixating unit to fixate the coupon holder on the outer rod surface of the sucker rod.

15. The corrosion testing device according to claim 1, wherein the coupon holder has multiple coupons and each coupon comprises a different type of material.

16. The corrosion testing device according to claim 1, wherein the coupon holder comprises at least one attachment unit to attach the at least one coupon to the holder body in a coupon position at the outer body surface wherein the at least one coupon is located at the radial coupon distance from the longitudinal body axis.

17. A sucker rod for a pump system, comprising:
an outer rod surface, and
at least one corrosion testing device that comprises:
    a coupon holder comprising a holder body having an outer body surface and an inner contact surface that is placed on the outer rod surface of the sucker rod and defines a longitudinal body axis of the holder body; and
    at least one coupon for corrosion testing, the at least one coupon attached to the holder body and positioned at the outer body surface and at a radial coupon distance from the longitudinal body axis, the outer body surface comprises at least one guiding surface part located at a radial surface distance from the longitudinal body axis, the radial surface distance larger than the radial coupon distance.

18. The sucker rod according to claim 17, wherein multiple corrosion testing devices are placed on the outer rod surface of the sucker rod at a holder distance from each other along the sucker rod.

19. A pump system comprising:
a sucker rod configured to move within a wellbore, the sucker rod comprising an outer rod surface; and
at least one corrosion testing device that comprises:
    a coupon holder comprising a holder body having an outer body surface and an inner contact surface that is placed on the outer rod surface of the sucker rod and defines a longitudinal body axis of the holder body; and
    at least one coupon for corrosion testing, the at least one coupon attached to the holder body and positioned at the outer body surface and at a radial coupon distance from the longitudinal body axis, the outer body surface comprises at least one guiding surface part located at a radial surface distance from the longitudinal body axis, the radial surface distance larger than the radial coupon distance.

20. The pump system according to claim 19, wherein multiple corrosion testing devices are placed on the outer rod surface of the sucker rod at a holder distance from each other along the sucker rod.

21. A method to test at least one material for use in a wellbore, the method comprising:
fixating a coupon holder of a corrosion testing device on an outer rod surface of a sucker rod of a pump system, wherein the at least one coupon comprises the at least one material, and the corrosion testing device comprises:
    the coupon holder comprising a holder body having an outer body surface and an inner contact surface that is placed on the outer rod surface of the sucker rod and defines a longitudinal body axis of the holder body, and
    the at least one coupon that is attached to the holder body and positioned at the outer body surface and at a radial coupon distance from the longitudinal body axis, the outer body surface comprises at least one guiding surface part located at a radial surface distance from the longitudinal body axis, the radial surface distance larger than the radial coupon distance;
placing the sucker rod and the corrosion testing device in the wellbore and reciprocally moving the sucker rod and the corrosion testing device within the wellbore for a predetermined time period; and
removing the sucker rod from the wellbore and analyzing the at least one coupon of the corrosion testing device to determine a corrosion rate for each of the at least one coupon.

22. The method according to claim 21, further comprising determining a suitability indicator of at least one material of the at least one coupon on basis of their corrosion rate.

23. The method according to claim 21, wherein the corrosion testing device further comprises multiple coupons which are made from a different material, and the method further comprises analyzing the multiple coupons to determine a corrosion rate for each of the multiple coupons.

24. The method according to claim 23, further comprising:
determining a suitability indicator of at least one of the materials of the at least one coupon on basis of their corrosion rates, and
selecting one of the materials of the coupons to be used for maintenance operations on at least one of the well bore or sucker rod based on the suitability indicator of the material.

25. The method according to claim 22, further comprising:
fixating multiple corrosion testing devices with their coupon holder on the outer rod surface of the sucker rod at a holder distance from each other along the sucker rod,
moving the sucker rod and the corrosion testing devices through the wellbore for a predetermined time period through a predetermined section of the wellbore, and
analyzing the coupons to determine a section corrosion rate for each of the coupons relating to the section of the wellbore in which the coupon has been moved.

26. The method according to claim 25, further comprising assigning a section suitability indicator of at least one material of the at least one coupon on basis of their section corrosion rate.

27. A kit of parts comprising;
a coupon holder having a holder body with an outer body surface and an inner contact surface, which inner contact surface is placeable on an outer rod surface of a sucker rod for a pump system and defines a longitudinal body axis of the holder body, the outer body surface comprising at least one guiding surface part located at a radial surface distance from the longitudinal body axis,
at least one coupon for corrosion testing, and
at least one attachment unit to attach the at least one coupon to the holder body of the coupon holder in a coupon position at the outer body surface, the at least one coupon in the coupon position located at a radial coupon distance from the longitudinal body axis, which radial coupon distance is smaller than the radial surface distance.

28. A coupon holder, comprising:
a holder body with an outer body surface; and
an inner contact surface, which inner contact surface is placeable on an outer rod surface of a sucker rod for a pump system and defines a longitudinal body axis of the holder body, wherein:
the outer body surface comprises at least one guiding surface part located at a radial surface distance from the longitudinal body axis,
at least one attachment unit is provided to attach at least one coupon for corrosion testing to the holder body of the coupon holder in a coupon position at the outer body surface, and
in use, the at least one coupon in the coupon position is located at a radial coupon distance from the longitudinal body axis, which radial coupon distance is smaller than the radial surface distance.

* * * * *

UNITED STATES PATENT AND TRADEMARK OFFICE
CERTIFICATE OF CORRECTION

PATENT NO. : 11,268,897 B2
APPLICATION NO. : 17/266477
DATED : March 8, 2022
INVENTOR(S) : Nicolino

Page 1 of 1

It is certified that error appears in the above-identified patent and that said Letters Patent is hereby corrected as shown below:

In the Specification

Column 4, Line 65, delete "moving 30 the" and insert -- moving the --.

Signed and Sealed this
Twenty-sixth Day of July, 2022

Katherine Kelly Vidal
*Director of the United States Patent and Trademark Office*